United States Patent [19]

Eouzan

[11] Patent Number: 4,528,595
[45] Date of Patent: Jul. 9, 1985

[54] LINE TRANSFER IMAGER AND TELEVISION CAMERA INCLUDING SUCH AN IMAGER

[75] Inventor: Jean-Yves Eouzan, Thorigne, France

[73] Assignee: Thomson-CSF, Paris, France

[21] Appl. No.: 531,727

[22] Filed: Sep. 13, 1983

[30] Foreign Application Priority Data

Sep. 14, 1982 [FR] France ............................ 82 15505

[51] Int. Cl.³ .............................................. H04N 3/14
[52] U.S. Cl. ...................................... 358/213; 357/24
[58] Field of Search ................... 358/213, 212, 41, 44, 358/48, 209; 357/241 R; 250/578

[56] References Cited

U.S. PATENT DOCUMENTS 4,016,550  4/1977  Weimer ........................... 357/24 LR
4,178,614 12/1979  Saver .................................... 358/213
4,453,177  6/1984  Berger et al. ......................... 358/44

Primary Examiner—Gene Z. Rubinson
Assistant Examiner—Stephen Brinich
Attorney, Agent, or Firm—Cushman, Darby & Cushman

[57] ABSTRACT

The line transfer imager includes a matrix containing m lines of p photosites. The selection of the lines of this matrix for the readout of stored charges corresponding to an image is controlled by two shift registers for the selection of odd and even lines of the matrix respectively. The photosites of the odd lines of a single column have their charges transferred into a first line memory associated with a first charge transfer output register having p stages, while the photosites of the same column of the even lines have their charges transferred into a second line memory associated with a second charge transfer output register also having p stages, by means of two conducting columns $C_i$ and $C'_i$ which can be read simultaneously or successively.

4 Claims, 7 Drawing Figures

LINE TRANSFER IMAGER AND TELEVISION CAMERA INCLUDING SUCH AN IMAGER

BACKGROUND OF THE INVENTION

1. Field of the Invention

The invention relates to line transfer imagers, for television cameras, including a photosensitive zone formed from photosites, photodiodes or photo MOS, providing the light-detecting function.

During illumination, each photosite collects an electrical charge directly proportional to the received illumination. This function is obtained by adequate polarization of the photosites.

2. Description of the Prior Art

Traditionally the photosensitive zone is arranged as a matrix of m lines of p photosites. At the end of the integration period, the electrical charges stored on one line are read. For this, the line is selected by a line selecting logical shift register. This selection has the effect of causing the draining of the charges stored under the elementary image zones, or pixels, defined by the photodiodes, into the conducting columns connecting the elementary zones of like position. The charges thus deposited into the columns are transferred into a line memory during line suppression periods. This storage is temporary as these charges are very rapidly again transferred into a charge transfer output register. The line memory acts as a buffer between the pixel and the charge transfer register and provides an anti-glare control. As soon as the charges contained in the pixels have been transferred into the line memory, the line is disconnected and the integration of charges function is resumed. Each of the lines in the matrix is successively addressed in this way until the complete readout of the image. The French patent application No. 80 09112 in the name of the applicant gives a detailed description of an embodiment of such an imager.

In this system, the charges from the m photosites of like position i (i=1 to p) are all transferred into the same output register by means of a single conducting column connected to a single memory element. The memory elements form one or two line memories depending on whether or not there is a demultiplexing between the even points and the odd points of a single line. The addressing of the m lines of the matrix is carried out by one shift register for a readout of all the lines successively or by two shift registers one for the selection of even lines and the other for the selection of odd lines, for a readout per frame.

These structures are well suited to black and white single sensor cameras, but they do not allow the obtaining of an optimal image quality in single-sensor or three-sensor color cameras, in which the video signal results from the combination of several elementary signals corresponding to neighboring pixels possibly located in the same column.

SUMMARY OF THE INVENTION

The problem raised is the realization of a line transfer imager enabling a video signal to be obtained for which subsequent processing is simplified, particularly in applications to single-sensor or three-sensor color cameras in which the video signal results from the combination of elementary signals coming from neighboring pixels covered by different color filters and belonging to different lines.

According to the invention, a line transfer imager including a matrix of m lines of p photosites and comprising, for controlling the reading of stored charges corresponding to an image, two selection shift registers having outputs connected to the photosites selection inputs of the odd and even lines of the matrix respectively, (p/2) conducting columns connecting the photosites of even positions of the odd lines and the photosites of odd positions of the even lines of the matrix to a first line memory of (p/2) stages with parallel outputs, (p/2) conducting columns connecting the photosites of odd positions of the odd lines and the photosites of even positions of the even lines of the matrix to a second line memory of (p/2) stages with parallel outputs, the (P/2) parallel outputs of each of the line memories being connected to every k stage of two charge transfer output registers having (kp/2) stages, k being equal to 2 or 3, the imager having two possible two readout modes, the first being a line by line reading of a frame formed by the odd lines of the matrix of photosites, then a frame formed by the even lines, the second called pseudo-interlaced, being the reading of two successive lines of the matrix during each line suppression period, the output of data contained in the two output registers being able to be, in this readout mode, simultaneous, one line of one image frame being formed by the combination of the data from two successive lines of the matrix.

BRIEF DESCRIPTION OF THE DRAWINGS

The invention will be better understood and other characteristics will become apparent from the following description referring to the appended drawings.

DESCRIPTION OF THE PREFERRED EMBODIMENT

The line transfer imager according to the invention is intended to function with a sweep of the photosensitive zone organized as two interlaced frames. These two frames are either read successively, in a first mode of operation called "mode 1", or read interlaced, in a second mode of operation called pseudo-interlaced "mode 2" in which two successive lines are read simultaneously or quasi-simultaneously during a line suppression period.

Figure 1:
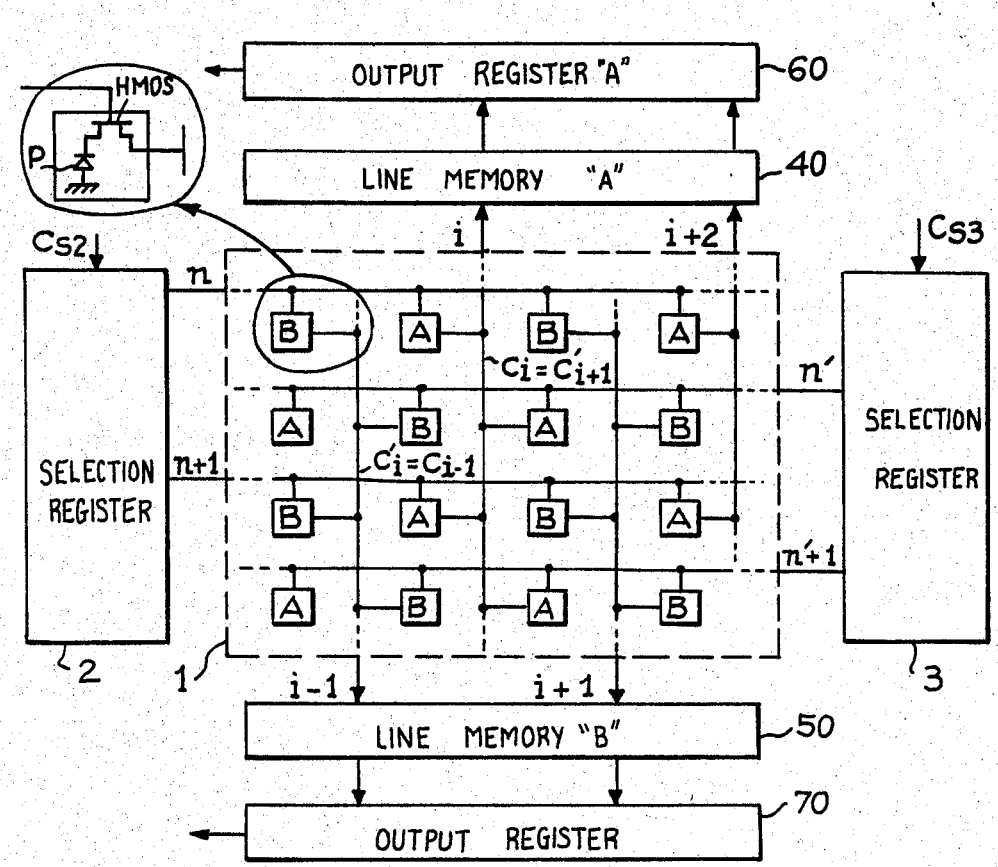
FIG. 1 represents an embodiment of the line transfer imager according to the invention.

The embodiment represented in FIG. 1 includes a photosensitive zone 1 formed from a matrix of m lines, each containing p photosites (p whole), two line selection logical shift registers 2 and 3, one associated with the odd lines, the other with the even lines. For example the matrix can contain 576 lines of 462 photosites. Each of the selection registers include (m/2) selection outputs, each of these outputs being connected to all the selection inputs of the photosites in a single line, two successive lines of pixels of the matrix being controlled by register 2 and register 3 respectively to produce an alternation of the lines in order to form the two interlaced frames.

As shown in the electrical diagram of a photosite in FIG. 1, each photosite is for example formed from a photodiode P of which the anode is at ground and of which the cathode is connected to the first electrode of a horizontal MOS transistor, having a control electrode, and a third electrode connected to a conducting column.

The charges accumulated in these photosites are transferred by conducting columns defined as follows: a conducting column $C_i$ on the one hand connects the photosites relating to the even frame of the matrix located in the matrix column in position i, and on other hand the photosites of the odd frame located in the matrix column in position i+1. Every other conducting column is connected to line memory A, 40, the other group of conducting columns being connected to line memory B, 50, these memories 40 and 50 each having (P/2) memory elements. The parallel outputs of memories 40 and 50 are connected to (P/2) parallel inputs of charge transfer output shift registers, 60 and 70, each having at least p stages, every other stage being connected to one memory output.

Thus are defined independent structures, in which the pixels labelled A and B respectively are alternately arranged. The selection of one complete line by one or other of the registers 2 and 3 leads to the simultaneous selection of the pixels relating to one structure and of the pixels relating to the other alternate structure. Even though the number of conducting columns connected to each line memory is equal to half the number p of pixels in a line, the complete output of data from shift registers 60 and 70 has the duration of one line, these shift registers including p stages or 3(P/2) stages depending on the mode of operation used as explained hereafter.

In fact this structure leads itself as indicated above to two possible modes of operation, Mode 1 in which the lines of one frame are read and then those of the next frame, and Mode 2 called pseudo-interlaced in which the lines of the even frame and of the odd frame of the matrix are interlaced. This imager also has the advantage of enbling a direct readout of the fixed structure noise superimposed on the useful signal, and caused by the structure of the photosites itself.

Figure 2:
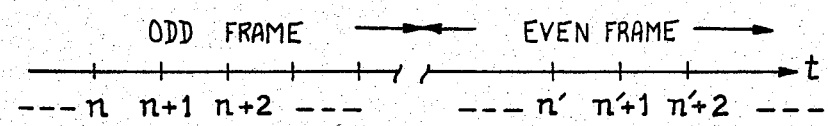
FIG. 2 represents the time sequence of imager lines for a first readout mode.

In the first mode of operation, selection registers 2 and 3 operate successively for the odd and even lines of the matrix respectively as represented diagramatically in FIG. 2: during selection of the line in position n by selection register 2, the odd points of this line are transferred into one of the line members, 40, and the even points of this same line are transferred into the other line memory, 50. These two transfers can be carried out simultaneously as the conducting columns corresponding to the even and odd points of a single line are independent. The charges stored temporarily in the line memories are transferred into the output shift registers 60, 70. During the readout of the next frame of the matrix by selection by register 3, the pixels that are alternate to those read during the first frame are transferred to the same line memory.

Figure 3:
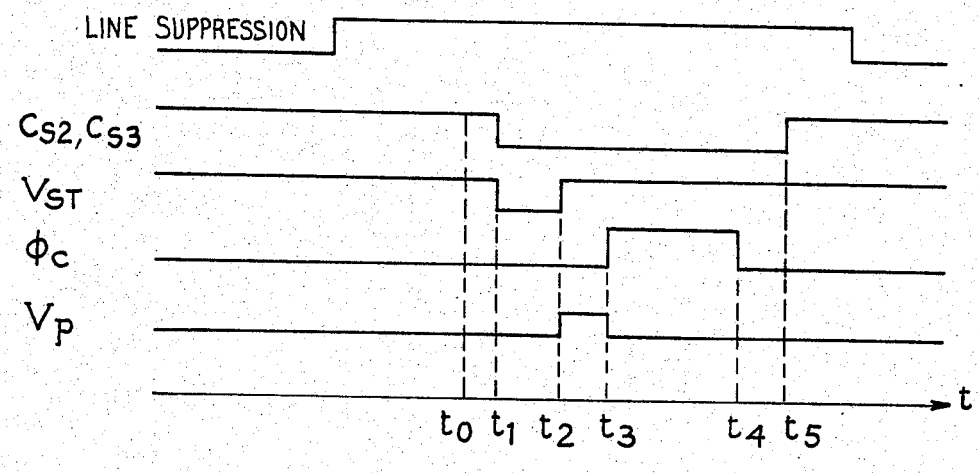
FIG. 3 is a timing diagram representing the control signals applied to the various parts of the imager during a line suppression period.

For the first mode of operation, without readout of fixed structure noise, a readout is obtained during a line suppression period by selection of the line and transfer into the memories and then into the shift registers. The timing diagram of the control signal is represented in FIG. 3.

This timing diagram of the control signals to be applied to the various parts of the imager is similar to the timing diagram of the signals applied to an imager which would include a single shift register associated with the series of lines in the photosensitive zone in which all the photosites of a single column of the matrix would be connected to a single conducting column associated with a single line memory and with a single shift register, these control signals being applied during the line suppression periods of the odd frame to structure A and during the line suppression periods of the even frame to structure B.

In a standard video signal, the duration of the line suppression period is equal to 12 micro-seconds. The transfer of charges from the pixels to the charge transfer output shift registers must therefore be carried out in a time shorter than this suppression period so that the data corresponding to an image line is transferred from the output registers to the associated processing circuits in the camera during the effective duration of the line. To achieve a transfer in a sufficiently short time, because this time is longer for weak charges, a constant charge $Q_0$ called the driving charge is added to the charge $Q_S$ forming the data. From the electrical point of view in the successive elements are therefore as follows: the photodiode P, a potential barrier $V_G$, the zone formed by the conducting column associated with the pixel, and the line memory formed from several electrodes: one at a potential $V_p$ enabling drainage of the charges to the memory element, $V_{ST}$ the electrode corresponding to the element, and $\phi_c$ the control electrode for the transfer of charges stored under electrode $V_{ST}$ to the output register.

At time $t_0$ the charge $Q_0$ is present under electrode $V_{ST}$.

At time $t_1$ the charge $Q_0$ of the electrode $V_{ST}$ and the charge $Q_S$ of the pixel are transferred into the conducting column. These charge transfers are obtained by lowering surface potential under the electrode $V_{ST}$ and on the photosite by the line selection control.

At time $t_2$ the charge, $Q_0$ and $Q_S$, is recovered under the electrode $V_{ST}$. In order to do this potential applied to the electrode is returned to the high level, while the potential barrier $V_{ST}$ is lowered.

At time $t_3$ the potential barrier $V_p$ is raised by returning $V_p$ to The low level as all the charges are stored under $V_{ST}$. Then the potential barrier $\phi_c$ is lowered on putting $\phi_c$ to the high level in such a way that the charges stored under $V_{ST}$ are transferred into the charge transfer output register.

At time $t_4$ the potential barrier $\phi_c$ is removed on lowering the corresponding potential in order to isolate the output register from the line memory.

At time $t_5$ the transfer of the line is completed and the line selection register returns the potential on the control electrode to the high level.

In this first mode, the sampling of the output data of the shift registers is controlled at a frequency that is twice as weak as that of the shift frequency in these registers because of the fact that these registers have a number of stages enabling the storage of a complete line.

This structure which gives rise to the output data from a single line on two different registers is particularly helpful for the suppression of fixed structure noise. In fact, in order to suppress the fixed structure noise and the smearing of outlines in present line transfer imagers, it is necessary digitally to process the signal, i.e. it is necessary, during the frame suppression period, to load into memory the digital form of a line that is the image of the fixed structure noise and of the smearing of outlines, the data corresponding to this line enabling the elimination for each line read of the fixed structure noise and the smearing superimposed on the useful signal.

The imager described in reference to FIG. 1 facilitates this processing while making it much more precise.

Figure 4:
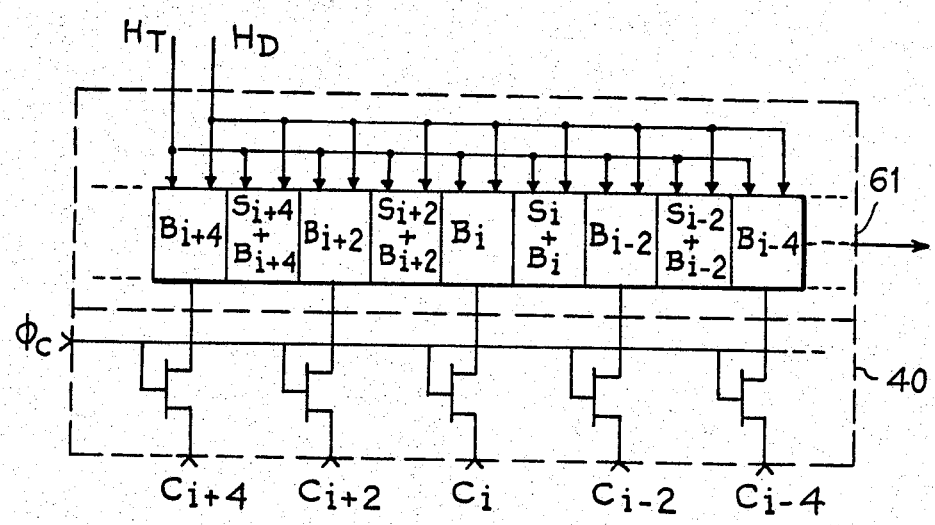
FIG. 4 is a detailed diagram of a first variant of the line memory-output register combination of the image represented in FIG. 1.

FIG. 4 shows in greater detail the structure of the line memory and of the corresponding shift register for the first mode of operation with readout of successive frames and detection of noise.

The memory 40, includes (P/2) memory elements, connected to the corresponding conducting columns, $C_{i+4}$, $C_{i+2}$, $C_i$, $C_{i-2}$, $C_{i-4}$ that are represented on the figure. The electrodes for the transfer of charges from these memory elements to the shift register, 60 for this first mode of operation are connected to every second stage of the shift register which contains p stages for this variant.

Figure 5:
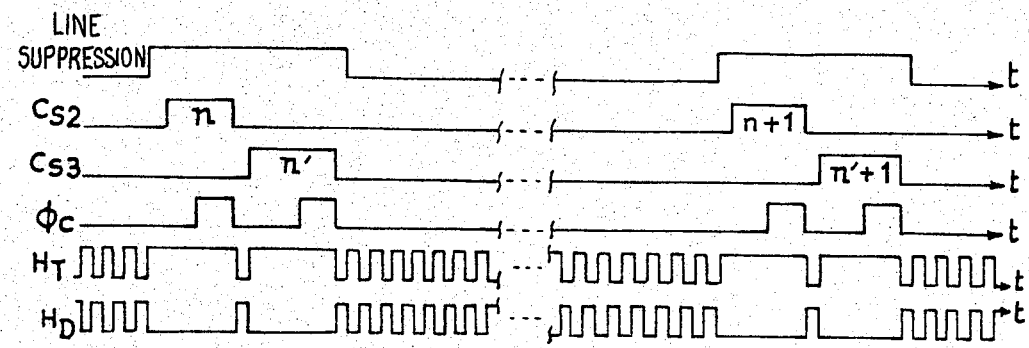
FIG. 5 is a timing diagram of the control signals applied to the imager represented in FIGS. 1 and 4 in a first mode, with readout of fixed structure noise, and in a second mode without readout of noise.

FIG. 5 is the timing diagram of the control signals corresponding to this first operational mode, with detection of fixed structure noise.

For the first mode of operation, with readout of fixed structure noise, two successive readouts are made during a line suppression period: the first, corresponding to the first positioning of the control electrode $\phi_c$ of the memory elements to the high level, is the readout of charges stored during the integration period on which the fixed structure noise and smearing are superimposed; the second, corresponding to the second positioning of this electrode $\phi_c$ to the high level is the readout of the fixed structure noise and the smearing from the same column.

In practice, all register stages are double and the charge transfer registers are controlled by two clock signals $H_T$ and $H_D$, successively controlling the transfer and shifting in these registers as follows:

The transfer into a charge transfer register of the content of the associated line memory occurs when clocks $\phi_c$ and $H_T$ are at the high level. When the transfer is completed, clock $\phi_c$ drops to the low level thus isolating the shift register from the line memory. The shift by one stage in the register is then carried out on taking $H_D$ to the high level and $H_T$ to the low level. Then $H_T$ is returned to high level and $H_D$ to low level. At the end of this operation the packets of charges delivered by the line memory are stored under the electrodes of stages controlled by $H_T$ not connected to the line memory. Transfer of the noise is then carried out by controlling the register with a second transfer pulse $H_T$.

At the end of the line suppression period, the data contained in the shift register can be transferred at normal rate. This data forms the following sequence: ..., $B_{i-2}$, $S_i+B_i$, $B_i$, $S_{i+2}+B_{i+2}$, $B_{i+2}$ ... where $B_k$ is the fixed structure noise read in column number k, and $S_k+B_k$, the useful data upon which the noise is superimposed, k being whole, even, less than or equal to p.

In register 71, not represented and associated with the other memory 50, the sequence of contents of the stages in the shift register is as follows: ..., $S_{i-1}+B_{i-1}$, $B_{i-1}$, $S_{i+1}+B_{i+1}$, $B_{i+1}$, ....

The structure represented in FIG. 1 also enables a pseudo-interlaced operation, two successive lines of the matrix being read during the same line suppression period. In the case of operation without detection of fixed structure noise, the stage number of the output shift registers is also equal to the number of pixels in the line, p; the structure is therefore the same as that represented in FIG. 4, and the timing diagram of the associated control signals is that represented in FIG. 5. But, during selection of line number n by selection register 2, the transfer of charges corresponding to the odd points of line n is carried out, then, line n' being selected, the second $\phi_c$ pulse enables the transfer of the charges corresponding to the even points in line n' into the same register, after a shift of one step has been carried out. Register 61 then has the following content: ..., $S_i^n$, $S_{i+1}^n$, $S_{i+2}^n$... while shift register 71 simultaneously has the following signals at its output: ..., $S_i^{n'}$, $S_{i+1}^{n'}$, $S_{i+2}^{n'}$...

Figure 6:
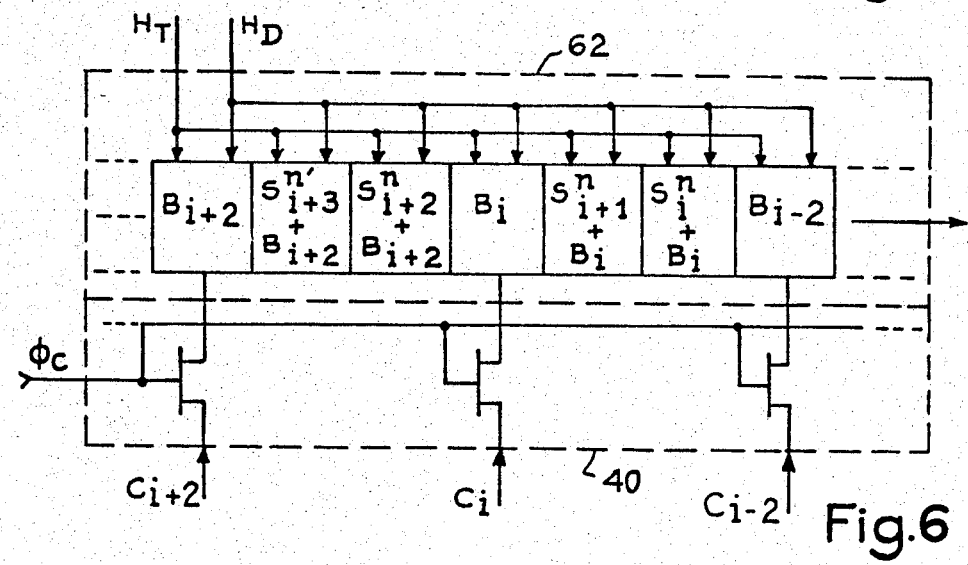
FIG. 6 is a detailed diagram of a second variant of the line memory-output register combination of the imager represented in FIG. 1.
Figure 7:
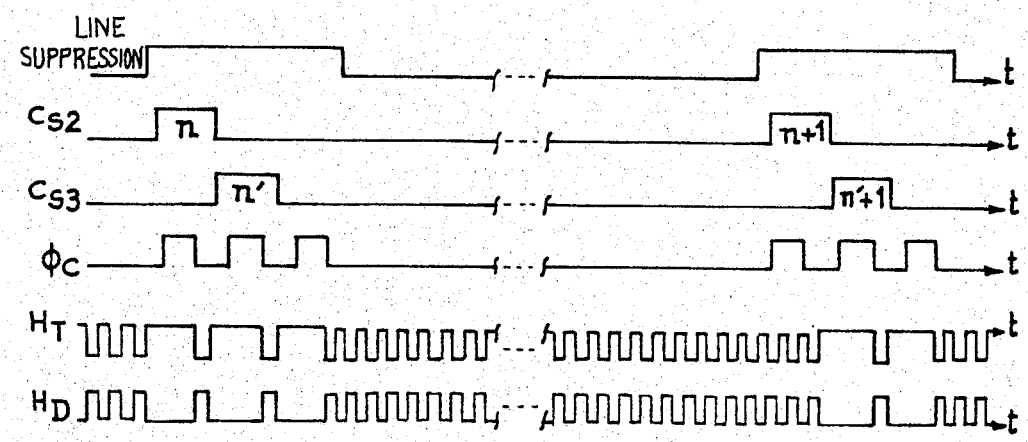
FIG. 7 is a timing diagram of the control signals applied to the imager represented in FIGS. 1 and 6 in a second mode, with readout of fixed structure noise.

For a pseudo-interlaced operation, with detection of fixed structure noise, the structure is a little different. It is partially represented in FIG. 6. Each memory, 40, 50, still contains (P/2) memory elements, but the charge transfer output registers, 62, 72, contain 3(P/2) stages. Three successive readouts are carried out during a single line suppression period. The timing diagram of the corresponding control signals is represented in FIG. 7. Having selected line n, the first readout causes the transfer of the charges of line n into memories 40 and 50, the odd points being transferred for example into memory 40 and the even points into memory 50. Having selected line n', the second readout causes the transfer of the even and odd points of that line into memories 40 and 50 respectively. Then, no line having been selected, the third readout causes the transfer of charges corresponding to the fixed structure noise in the conducting columns. After each of the first two readouts, a shift of one stage is carried out in the output registers. After the readout of noise, the sequence of data contained in shift register 62 for example is as follows:

$$\ldots S_i^n+B_i, S_{i+1}^{n'}+B_i, B_i, S_{i+2}^n+B_{i+2},$$
$$S_{i+3}^{n'}+B_{Bi+}\ldots$$

and in register 72:

$$\ldots S_{i-1}^n B_{i-1}, S_i^{n'}+B_{i-1}, B_{i-1}, S_{i+1}^n B_{i+1},$$
$$S_{i+2}^{N'}+B_{i+1}, B_{i+1}\ldots$$

As can be seen in the signal sequences described above, two samples relating to two successive lines have been conveyed by the same column, and have been affected by the same noise. This noise has been detected by a transfer of charges carried out after the transfer of the data signals (this noise can also be detected before detecting the packets of charges stored in two successive lines) and it is therefore possible, from this group of three packets of charges having been conveyed by the same column, to eliminate the degradations present in the data on the useful lines.

I claim:

1. Line transfer imager including a matrix of m lines of p photosites and comprising, for controlling the reading of stored charges corresponding to an image, two selection shift registers having outputs connected to the photosites selection inputs of the odd and even lines of the matrix respectively, (P/2) conducting columns connecting the photosites of even positions of the odd lines and the photosites of odd positions of the even lines of the matrix to a first line memory of (P/2) stages with parallel outputs, (P/2) conducting columns connecting the photosites of odd positions of the odd lines and the photosites of even positions of the even lines of the matrix to a second line memory of (P/2) stages with parallel outputs, the (P/2) parallel outputs of each of the line memories being connected to every k stage of two charge transfer output registers having (kp/2) stages, k being equal to 2 or 3, the imager having two possible readout modes, the first being a line by line reading of a frame formed by the odd lines of the matrix of photosites, then a frame formed by the even lines, the second, called pseudo-interlaced, being the reading of two successive lines of the matrix during each line suppression period, the output of data contained in the two output registers being able to be, in this readout mode, simultaneous, one line of one image frame being formed by the combination of the data from two successive lines of the matrix.

2. Imager according to claim 1 wherein said pseudo-interlaced mode, one of said selection registers controls during a first part of the line suppression periods, the transfer of the odd and even points of a line of the matrix into the associated memories, the other of said selection registers controlling during a second part of the line suppression periods the transfer of the even odd points of the next line of the matrix into the associated memories, a first transfer from the memories into the output registers followed by a shift of one stage in the registers being carried out after the first transfer into the memories.

3. Imager according to claim 1 wherein, for the readout of fixed structure noise, in the first mode of readout by successive frames, said selection registers controls during a first part of the line suppression periods the transfer of the odd and even points of a line of the matrix into the associated memories and in that, and during a second part of the line suppression periods, the transfer of the fixed structure noise of the corresponding conducting columns into the corresponding memories, each transfer of a line of said matrix from the memories to the connected (P/2) stages of the shift registers being followed by a shift of one stage in the output registers.

4. Imager according to claim 2 wherein, for the readout of fixed structure noise in said pseudo-interlaced mode, the output shift registers contain 3 (P/2) stages, every third stage being connected to an output of the associated memory, the successive transfers of the points of two successive lines carried out during a suppression period being completed by a transfer of the fixed structure noise of the corresponding conducting columns during a third part of the same line suppression period, and two shifts being carried out in the output register after each transfer of the content of the corresponding memory into the associated register.

* * * * *